(12) United States Patent
Zemach

(10) Patent No.: US 9,845,958 B2
(45) Date of Patent: Dec. 19, 2017

(54) INTERACTIVE LEARNING WATER HEATING SCHEDULER

(71) Applicant: Shai Zemach, Kfar Yona (IL)

(72) Inventor: Shai Zemach, Kfar Yona (IL)

( * ) Notice: Subject to any disclaimer, the term of this patent is extended or adjusted under 35 U.S.C. 154(b) by 0 days.

(21) Appl. No.: 14/421,155

(22) PCT Filed: Feb. 10, 2015

(86) PCT No.: PCT/IL2015/050151
§ 371 (c)(1),
(2) Date: Feb. 12, 2015

(87) PCT Pub. No.: WO2015/121856
PCT Pub. Date: Aug. 20, 2015

(65) Prior Publication Data
US 2016/0258635 A1  Sep. 8, 2016

Related U.S. Application Data

(63) Continuation-in-part of application No. 14/178,344, filed on Feb. 12, 2014.

(60) Provisional application No. 61/992,281, filed on May 13, 2014.

(51) Int. Cl.
| | |
|---|---|
| *F24D 19/10* | (2006.01) |
| *F24D 17/00* | (2006.01) |
| *G05D 23/19* | (2006.01) |

(52) U.S. Cl.
CPC ..... *F24D 19/1081* (2013.01); *F24D 17/0021* (2013.01); *F24D 17/0068* (2013.01); *F24D 19/1063* (2013.01); *G05D 23/1917* (2013.01); *Y02B 10/70* (2013.01)

(58) Field of Classification Search
CPC ............ F24D 19/1081; F24D 19/1006; F24D 19/1048; F24D 19/1051; F24D 19/1063; G05D 23/1917; Y02B 10/70
See application file for complete search history.

(56) References Cited

U.S. PATENT DOCUMENTS

| | | | |
|---|---|---|---|
| 6,002,114 A | 12/1999 | Lee | |
| 2010/0004790 A1* | 1/2010 | Harbin, III | .......... F24D 19/1051 700/291 |
| 2011/0044671 A1* | 2/2011 | Amiran | ............... F24D 17/0031 392/441 |
| 2012/0118989 A1* | 5/2012 | Buescher | .............. F24H 9/2021 237/8 A |

(Continued)

FOREIGN PATENT DOCUMENTS

| | | |
|---|---|---|
| CN | 101344443 | 1/2009 |
| EP | 2487427 | 8/2012 |
| WO | 2012081014 | 6/2012 |

*Primary Examiner* — Dennis M Butler
(74) *Attorney, Agent, or Firm* — Mark M. Friedman

(57) ABSTRACT

A method and system for providing an interactive learning heating schedule for a water boiler system, the method including the steps: (a) receiving an estimate of an amount of available hot water in a water boiler of the water boiler system; (b) receiving usage data for the water boiler system, the usage data including at least one expected usage pattern extrapolated from the usage data; and (c) generating a heating schedule for the water boiler, based on at least one expected usage pattern and the estimated amount of available hot water.

16 Claims, 12 Drawing Sheets

(56) References Cited

U.S. PATENT DOCUMENTS

2015/0323391 A1\* 11/2015 McCulloch ........... F24H 9/2007
  374/185

\* cited by examiner

FIG. 10 DATA-PROCESSING SUBROUTINE 2

INTERACTIVE LEARNING WATER HEATING SCHEDULER

FIELD OF THE INVENTION

The present invention relates to a control system for improving energy efficiency related to household water boilers and, more particularly, an interactive learning system for controlling a household hot water heating schedule.

BACKGROUND

It is the purpose of most 'Green Tech' devices and systems to conserve energy resources by improving energy consumption methods or offering alternative resources. To date heating household water is by and large an unchecked source of energy consumption in developed countries, where the household water is constantly heated all day long throughout the year. Some countries make use of solar heating mechanisms to supplement electrical heating of the household water heater (boiler), particularly in the summer months. Due to conservation concerns, the rise in fuel product prices causing a rise in the prices of electricity and the concern over pollution caused by power stations, there is a need for a system to help regulate electrical consumption, and specifically for monitoring energy consumption in the process of heating household water.

SUMMARY OF THE INVENTION

There is currently provided an interactive learning system for controlling a household hot water heating schedule.

There is provided a retrofit water boiler monitoring and forecast system, for a water boiler system which includes a water boiler, a cold-water intake pipe, a hot-water outlet pipe, the retrofit system including: (a) an intake temperature sensor, configured to measure a water temperature in the cold-water intake pipe; (b) a flow meter, configured to measure a flow rate of water running through the water boiler system; (c) an outlet temperature sensor, configured to measure a water temperature in the hot-water outlet pipe; (d) a processing unit, adapted to receive sensor data from the intake temperature sensor, the flow meter, and the outlet temperature sensor, and configured to calculate an amount of available hot water in the water boiler, based on the sensor data; and (e) a display panel operationally coupled to the processing unit, the display panel configured to display at least one estimated Real-Time Usage Value (RTUV), calculated by the processing unit based on the amount of available hot water.

According to further features in preferred embodiments of the invention described below the system further includes: (f) a control panel operationally coupled to the processing unit, including a user interface adapted to receive instructions for programming and controlling the processing unit.

According to still further features in the described preferred embodiments the control panel is operationally coupled to an activation switch of the water boiler.

According to still further features the processing unit includes: a non-transient memory adapted to retrievably store usage data, the usage data including the sensor data recorded over time.

According to still further features the display panel is adapted to be mounted in a bathing area.

According to still further features the at least one estimated RTUV is an estimated amount of time remaining during which the hot water will be available, based on the flow rate.

According to still further features the at least one estimated RTUV includes a number of distinct hot-water activities that can be completed with the amount of available hot water.

According to still further features another estimated RTUV displayed on the display panel includes a measure of time remaining for completing one of the distinct hot water activities, based on the flow rate.

According to still further features the another estimated RTUV displayed on the display panel includes a measure of time remaining for completing one of the distinct hot water activities, based on the flow rate.

According to still further features the at least one Real-Time Usage Value includes an indication of a working condition of a heating element of the water boiler system.

According to still further features the working condition of the heating element is calculated based on the sensor data compared to the usage data.

According to still further features the processing unit includes logic for calculating the amount of available hot water, the logic including an adaptive learning algorithm configured to learn characteristics of the water boiler system based on the usage data stored in the non-transient memory.

According to still further features the amount of available hot water is calculated based on the learned characteristics of the water boiler system.

According to still further features the amount of available hot water is further calculated based on learned usage characteristics of the water boiler.

According to still further features the processor calculates a relative level of efficiency of a heating element of the water boiler system, based on the learned characteristics of the water boiler system.

According to still further features the processing unit includes logic for calculating the amount of available hot water, the logic including an adaptive learning algorithm configured to learn usage characteristics of the water boiler based on the usage data.

According to still further features the amount of available hot water is further calculated based on learned characteristics of the water boiler.

According to still further features the processing unit includes logic configured to detect a leak in the water boiler system, based on the sensor data.

According to still further features the processing unit is configured to distinguish between sources of hot-water usage.

According to still further features the system is further adapted for use with a water boiler system including a solar collector, the retrofit system further comprising at least one of: (i) a second flow meter adapted to measure water flow through the solar collector operationally coupled to the water boiler; (ii) a solar collector outlet sensor adapted to measure temperature of water flowing from the solar collector to the water boiler; and (iii) a solar collector intake sensor adapted to measure temperature of water flowing from the water boiler to the solar collector.

According to still further features the system further includes a photo voltaic (PV) cell, the PV cell being adapted to provide solar-related data.

According to still further features the PV cell further produces usable energy.

According to still further features the usable energy is adapted to power at least the retrofit system.

According to another embodiment there is provided a method for providing a real-time estimate of available hot water in a hot water boiler, the method including the steps of: (a) receiving flow data; (b) receiving an outlet temperature measurement of water in a boiler outlet pipe; and (c) receiving an intake temperature measurement of water in a boiler intake pipe; (d) calculating an estimated amount of hot water in the boiler based on the flow data, outlet temperature measurement and intake temperature measurement.

According to still further features the system further includes the step of: (e) receiving a thermostat value, prior to step (d).

According to still further features the flow data includes at least one of: a flow rate value and a flow duration value.

According to another embodiment there is provided a method and a computer program product embodied on a non-transitory storage medium and executed via a processor for calculating an estimated amount of hot water in a water boiler, including the steps of: (a) receiving sensor data over a predetermined time interval, the sensor data including at least: flow data, an outlet temperature measurement of water in a boiler outlet pipe and an intake temperature measurement of water in a boiler intake pipe; (b) comparing the received sensor data with stored sensor data; and (c) calculating, based on the comparison, an approximate amount of available hot water in the water boiler.

According to still further features the method further includes the step of: (d) storing the received sensor data on a non-transient storage medium.

According to still further features the stored sensor data includes aggregated sensor data.

According to still further features the method further includes the step of: (d) analyzing the flow sensor data so as to extrapolate usage data.

According to still further features the usage data includes: (i) distinct usage activities, (ii) usage patterns for the distinct usage activities.

According to still further features the method further includes the steps of: (e) calculating, based on the estimated amount of available hot water and the usage patterns, an amount of the distinct usage activities that can be effected; and (f) displaying the amount of distinct usage activities that can be effected.

According to still further features the method further includes the steps of: (e) forecasting, based on the estimated amount of available hot water and the flow sensor data, an amount of time delta for which hot water will be available from the water boiler, and (f) displaying the time delta.

According to still further features the method further includes the step of: (d) analyzing the sensor data to extrapolate water boiler characteristics.

According to still further features the water boiler characteristics include at least one of: (i) boiler efficiency, (ii) heating time, (iii) water leakage, and (iv) environmental affect on the heating time.

There is provided a method for providing an interactive learning heating schedule for a water boiler system, the method including the steps: (a) receiving an estimate of an amount of available hot water in a water boiler of the water boiler system; (b) receiving usage data for the water boiler system, the usage data including at least one expected usage pattern extrapolated from the usage data; and (c) generating a heating schedule for the water boiler, based on at least one expected usage pattern and the estimated amount of available hot water.

According to further features in preferred embodiments of the invention described below the system further includes the step of: (d) detecting a deviation in the expected usage pattern, and (e) adjusting the heating schedule as a result of the detected deviation.

According to further features the deviation is selected from the group of deviations including: a current deviation in the expected usage pattern and an expected deviation in the expected usage pattern.

According to further features the method further includes the step of: (f) sending a feedback request to a user after detecting the deviation and prior to adjusting the heating schedule.

According to further features the method further includes the step of sending a secondary request after a predetermined time has lapsed prior to receiving a feedback response to the feedback request.

According to further features the secondary request is selected from the group of requests including: a second feedback request to the user, a second feedback request to a second user related to the user.

According to further features the step of adjusting the heating schedule is performed after a predetermined time has lapsed prior to receiving a feedback response to the feedback request.

According to further features step of adjusting the heating schedule is skipped after a predetermined time has lapsed prior to receiving a feedback response to the feedback request.

According to further features the method further includes the step of: (g) receiving a feedback response from the user, wherein the step of adjusting the heating schedule is performed or skipped based on the feedback response.

According to further features the expected usage pattern is further extrapolated from a location of a user of the water boiler system.

According to further features the expected usage pattern is further extrapolated from a location of a user of the water boiler system and wherein the deviation is detected when the location of the user is different from an expected location of the user.

According to further features the expected usage pattern is further extrapolated from an activity of a user of the water boiler system.

According to further features the expected usage pattern is further extrapolated from an activity of a user of the water boiler system and wherein the deviation is detected when the activity of the user is different from an expected activity of the user.

According to further features expected usage pattern is further extrapolated from an activity and location of a user of the water boiler system.

According to further features expected usage pattern is further extrapolated from an activity and location of a user of the water boiler system and wherein the deviation is detected when the activity and location of the user is different from an expected activity and location of the user.

BRIEF DESCRIPTION OF THE DRAWINGS

Various embodiments are herein described, by way of example only, with reference to the accompanying drawings, wherein.

DESCRIPTION OF THE PREFERRED EMBODIMENTS

Figure 1:
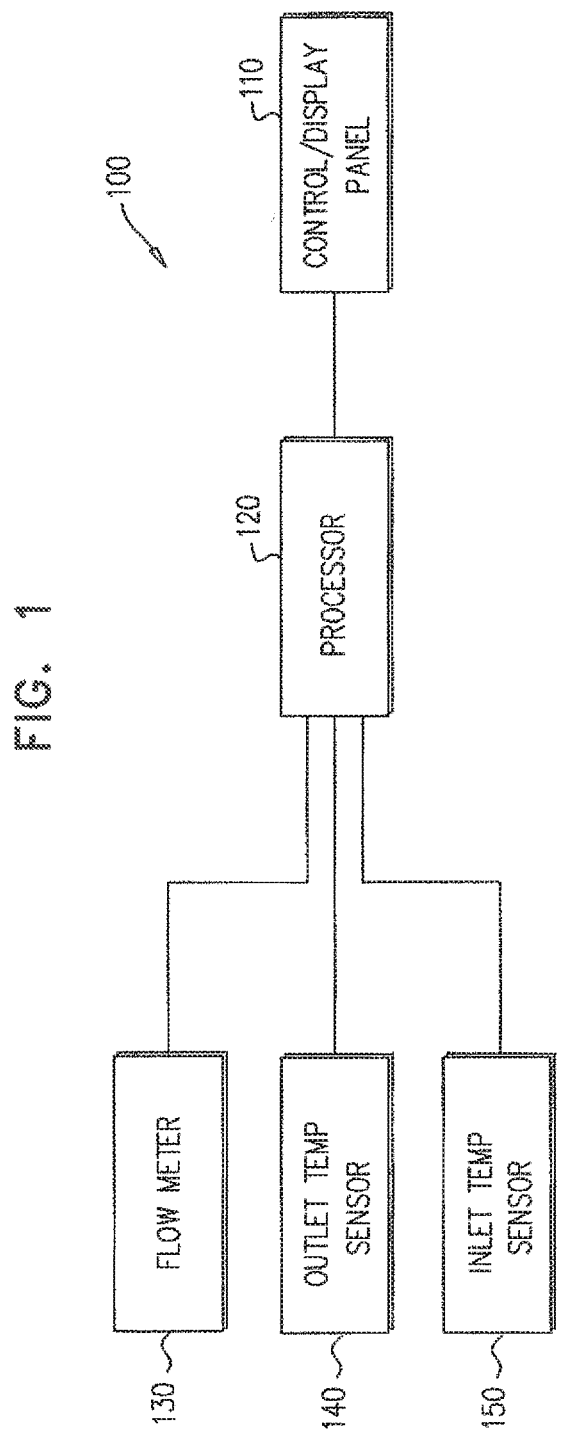
FIG. 1 is a block diagram of a basic system of the immediate innovation.

The principles and operation of a retrofit or integrated monitoring and forecast system for a household water heater according to the present invention may be better understood with reference to the drawings and the accompanying description.

Before explaining embodiments of the invention in detail, it is to be understood that the invention is not limited in its application to the details of design and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

Various embodiments of the invention include the same basic components. Similar components are indicated with a reference number with the same last two-digits but with a first digit which signifies the Figure number.

Referring now to the drawings, FIG. 1 illustrates a block diagram of a basic system 100 of the immediate innovation. The immediate system is a retrofit monitoring system in which a processing unit/processor 120 receives measurement values in the form of sensor data from sensors adapted to be attached to a water heater system. Processor 120 is a general purpose microprocessor, a processor implemented using digital signal processing (DSP) or an application specific integrated circuit (ASIC) or a combination of the different technologies and/or other similar technologies. Processing unit 120 may include a plurality of microprocessors and/or additional components known in the art. Preferably, the processing unit further includes a memory for storing usage data and/or programming instructions. The memory may be a transient memory storage unit, a non-transient memory storage unit or a combination of both. Preferably, the storage medium for storing programming in the form of computer-readable instructions includes non-volatile memory. In some embodiments, the processing unit stores usage data to the memory and retrieves the data from the storage medium in order to improve the accuracy of the various calculations of available hot-water, amount of hot-water needed for predefined or requested tasks etc. Usage data includes sensor data recorded over time as well as any other relevant pieces of data.

The sensors include a flow meter 130, an outlet temperature sensor (TS) 140 and an intake temperature sensor 150. The flow meter and inlet TS are adapted to be attached to the inlet/intake pipe which runs from the house water mains to the water heater, bringing cold water in to be warmed in the heater/boiler. The outlet TS is adapted to be attached to the hot outlet pipe running from the boiler to the hot water distribution system in the house. The sensors relay the flow rate of water entering/leaving the boiler and the temperatures of the incoming cold water and outgoing hot water to the processing unit via wired or wireless means.

Processor 120 receives at least the aforementioned information/values from the sensors (the flow meter is considered a sensor as it senses the rate of water flow even though technically it is a meter, which counts the amount of water passing through the apparatus, both terms are considered synonymous herein) and calculates the approximate amount of hot water available in the water boiler, based on the received sensor data. The processing unit uses flow rate algorithms, and in some embodiments, additional temperature and usage information (e.g. the volume of the boiler tank, thermostat activity, historical usage and the like), to deduce the approximate amount of hot water remaining in the boiler.

The processing unit uses the calculated amount of hot water, which is constantly updated in real-time (based on sensor data which is produced and transmitted to the processor on an ongoing basis), to estimate various Real-Time Usage Values (RTUV). Usage values can be, for example, the amount of hot water available in the water boiler, the amount of time remaining during which hot water will be available, the number of hot-water activities that can be accomplished before the hot water runs out, the amount of time remaining before the requisite amount of hot water is available, the status of the heating element and more. The derived usage values (time remaining, number of hot water activities available, working condition of the heating element, etc.) are appropriately displayed on a control/display panel 110.

In some embodiments, the control panel is separate from the display panel. The control panel includes a user interface (touch screen, buttons, other types of actuators, etc.) for directly controlling the water boiler functions (via the processing unit) and/or for programming the processing unit to perform desired tasks at desired times. In both embodiments, the control panel is connected, at least, to the activation switch of the water boiler. In some embodiments, the control panel can be programmed to provide a predefined (approximate) amount of hot water, or a sufficient hot water for a required/requested number of hot-water activities. In all cases, the control panel can be used to set predefined parameters for heating certain amounts of water at certain times, or ensuring that a required amount of hot water is available at requested times. In some embodiments, the display panel can display an approximate amount of time needing to elapse before the requested amount of hot water is ready. The displayed information reflects calculations made by processing unit 120 based on substantially real-time sensor information.

Figure 2:
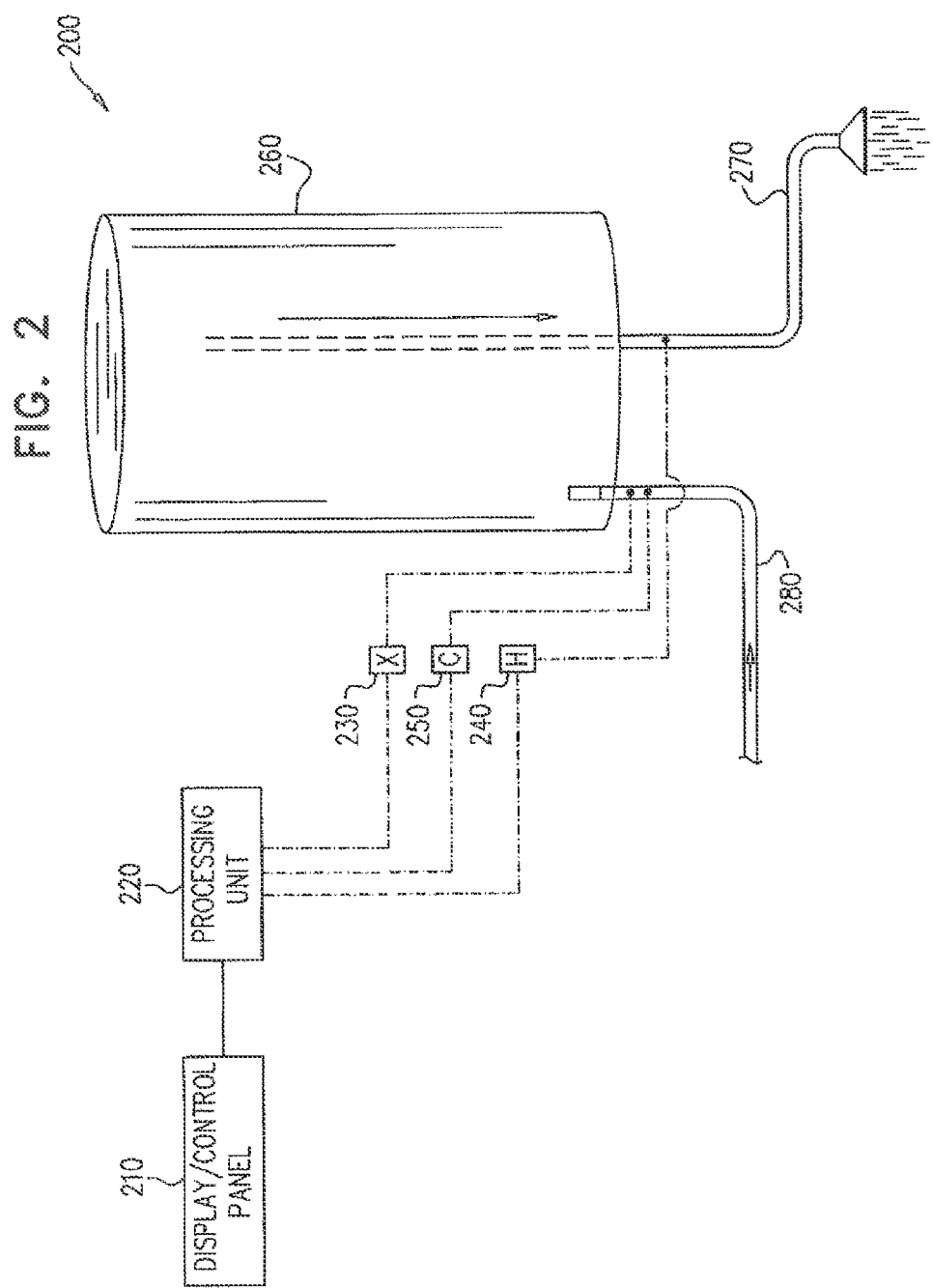
FIG. 2 is a pictorial depiction of a boiler system augmented with an exemplary configuration of the system of FIG. 1.

FIG. 2 depicts an embodiment of the system of FIG. 1, wherein a water heater (boiler) system 200 is augmented with the exemplary configuration of the immediate monitoring and forecast system. A typical water boiler system includes a water boiler 260, a cold-water intake pipe 280 which brings in cold water from an external source, and a hot water outlet pipe 270 from the boiler (usually located near the top of the boiler where the hottest water is found) to the household system of pipes for dispersion throughout the house (e.g. to the bathroom, kitchen, laundry room etc.).

In the depicted, exemplary configuration, the system collects data from three sensors assembled on the boiler: a first temperature sensor (C) 250 measures the temperature of the water in the intake line 280; a second temperature sensor (H) 240 measures the temperature of the water in hot-water outlet pipe leading out of the boiler; and a flow meter (X) 230 which measures the flow rate of water moving through the cold-water intake line, into the boiler. The flow rate sensor can be placed on either the intake or outlet lines as the boiler system is a closed system (however much water leaves the water heater must come into the water heater from the intake pipe), although the flow meter of the immediate embodiment of the invention measures flow rate on the intake line (providing a further feature of sensing a leak in the boiler, see below). The sensors (the flow meter is considered a sensor for all intents and purposed) record and/or transmit the sensed data to a processing unit 220 for processing.

The system analyzes input from the sensors, calculates the amount of available hot water and displays a real-time estimation of water availability on a display unit 210 (preferably located in the bathing area such as a shower or bathroom). In a basic embodiment, the estimation of available hot water is based on the sensed values of water temperature (intake and outlet values as well as heating duration, and in some embodiments—thermostat values) and flow rate of hot water in use. The system is capable of learning the heating properties of the boiler, as well as user habits, in order to create a more efficient and economical heating plan.

In some embodiments, the processing unit includes logic for an adaptive learning algorithm configured to learn the characteristics of the water boiler system. For example, the processing unit records heating history of the water boiler, such as: duration of active heating element, intake temperatures, thermostat readings etc. Exemplarily, the processing logic estimates the relative heating efficiency of the heating element of the boiler, based on a comparative study of heating times.

'Logic' is defined, within the meaning of this document, as a set of instructions or programming embodied in software, firmware and/or hardware for effecting various actions and/or processes. The logic may be in the form of a computer program product or programming embodied on a computer readable medium such as transient or non-transient memory and executed via a processor. Alternatively stated, the logic or programming may be embodied on a transitory or non-transitory storage medium and executed via a processor.

In some embodiments, the processing unit includes logic for an adaptive learning algorithm configured to learn usage characteristics of the water boiler. Generally, the processing component includes predefined usage values for bathing and other water use activities. For example, an average bath uses 13-15 gallons of hot water whereas an average shower uses about 6-8 gallons of hot water. Of course, individual usage will vary. For example, children generally shower for longer than adults. On the other hand, a bath for a child generally uses less water than a bath for an adult. Therefore, the learning algorithm identifies distinct bathing activities (e.g. adult shower, adult bath, child shower, child bath) as well as other hot water usage activities such as: washing machine, dishwasher, sink use, incidental use (hot water drawn from the boiler but not reaching the faucet outlet, a common cause is a single faucet for cold and hot water that is accidentally opened to draw hot water during short usage such as washing hands or food).

In some embodiments the processor learns the particular behaviors of the household system, including the number of hot water usage activities and when the activities generally take place. For example, the system can determine that each evening between 6 pm and 8 pm two long showers take place (child showers) while between the hours of 9 pm to 11 pm, two short showers take place (adult showers).

In some embodiments the processor includes logic for determining if there is a leak in the boiler system. In a simple configuration, the system determines whether there is a leak in the hot water system by detecting a constant flow of water through the system, sensed by the flow meter. In other configurations, the system may alternatively or additionally determine a leak or likelihood of a leak based on unexpected results such as higher the usual water usage over a given amount of time; and/or cooler water than predicted (possibly due to the constant introduction of cold water into the hot water boiler); and/or higher electricity/power usage than expected.

Real-Time Calculation and Display

Whenever the processor receives new sensor data from the sensors or thermostat, the processor calculates a new or updated estimate of available hot water and, if applicable, immediately displays the new calculation data on the display panel. In this manner, the system provides a real-time estimate of available bathing water. For example, at a given time in the evening, the display shows that there is sufficient hot water for four showers (two short and two long); a member of the house has a shower for an average amount of time; after the shower, the display shows that there is now only enough hot water for three showers. When the hot water system is not in active use (i.e. the heating element is not activated or no hot water is being used), the calculated data may only be updated and/or displayed periodically. Exemplarily, the calculation is made based on some or all of: the thermostat reading of the boiler (whether an actual temperature or simply an indication of 'active' or 'inactive'), the volume of the boiler tank, the heat of the water leaving the tank, the temperature of the cold water entering the tank, and the flow rate.

Continuing the previous example, the display can be positioned in the shower (waterproof and with shielded wires or wireless communication etc.), and show, as a function of time (rather than units of bathing activities) how much hot water remains in the tank, at the present output rate. The user can then adjust the hot-to-cold water ratio or the overall output rate. Either activity would be reflected in a real-time change in the estimate of available hot water (displayed as a function of time).

In one embodiment, the display can show an amount of water available for a particular shower (e.g. each family member is apportioned X amount of hot water for a shower). The family member can adjust the flow rate and/or hot-to-cold ratio in order to increase the amount of time in the shower. The experience can be very educational, teaching the user how to optimize water use in general and hot water use in particular. The display also heightens user-awareness regarding the amount of water being used. Conservation increases with awareness and education. A real-time display of water usage over time is a very good educational and awareness tool.

For example, 6.5 gallons (average amount of hot water used in a shower) is approximately 25 liters; if 25 liters of water are available in the hot water tank and the hot water flow rate is 5 liters per minute, then (discounting additional factors for the sake of simplifying the example) the hot water will run out after 5 minutes. The display on the shower wall shows a counter counting down from 5 minutes to zero. The user understands that at that rate the shower will be very short. The user then adjust the flow rate either by reducing the velocity of the water in the shower or lowering the ratio of hot water to cold water or both. The new flow rate (received from the flow meter) shows that the hot water is now coming out at a rate of 2.5 liters per minute, changing the counter to display 10 minutes. If the amount of water available is X and the flow rate is F then the time T left for using the available hot water can be calculated as: T=X/F.

Of course, this is an oversimplification as the amount of hot water varies as a result of usage. In fact available 'hot' water is not a constant but rather a range of temperatures. For example, available hot water can be defined as the amount of water that is heated to a temperature between 30° C. and 70° C. More preferably the range is between 40° C. and 60° C. Most preferably, the range is between 45° C. and 55° C.

In one embodiment, an additional flow-meter (not shown) is attached to the household intake pipe. Data from the flow meter provides overall water-usage data, besides for the hot water usage data. Displaying the overall water usage improves the educational and awareness aspects of the system.

In some embodiments, the display panel can provide different display modes. For example, one mode can display the number of showers available (as above), another mode can show the number of baths available, a third mode can show the amount of time available (as discussed above) before the hot water runs out. Other display modes can include dishwasher usage, washing machine usage and sink usage. A discerning user will then be able to plan when and for how long to activate the heating element of the boiler system (if practical/available) and/or plan various activities so that there will be hot water available for each activity (e.g. only run the dishwasher after the children have showered, but not too late so that the water heater will have time to heat the tank enough for later showers). The system can be programmable and automated. The user can program a daily shower regimen (e.g. two early showers and two late showers as exemplarily discussed above) and the system will ensure available hot water for each of the desired activities. Therefore, if the dishwasher, for example, is run unexpectedly (i.e. not scheduled or programmed into the system), the microprocessor will activate the boiler system to ensure that there is sufficient hot water for the scheduled events (e.g. bath, shower, washing machine etc.).

In some embodiments of the invention, the processing unit is capable of discerning different sources of water-usage. For example, a slow flow rate over a relatively short duration of time indicates sink use, while a higher rate over the same time or less can be attributed to a shower activity. Various studies have shown average flow rates of distinct activities, such as the NREL[1] study titled *Performance Comparison of Residential Hot Water Systems*[2], published March 2003. Figure X shows Table 3 of the study, including the estimated Gallon Per Minute (GPM) usage of various faucets in a house, corresponding to various activities (e.g. kitchen faucet includes dishwasher use and sink use; laundry faucet includes the washing machine etc.).

[1] National Renewable Energy Laboratory, NREL is a U.S. Department of Energy Laboratory Operated by Midwest Research Institute • Battelle • Bechtel

[2] Available for sale to the public, in paper, from: U.S. Department of Commerce National Technical Information Service, 5285 Port Royal Road, Springfield, Va. 22161

In some embodiments, the processing logic combines known and/or learned values together with learned usage behaviors and/or characteristics of the boiler system to estimate availability.

Figure 3:
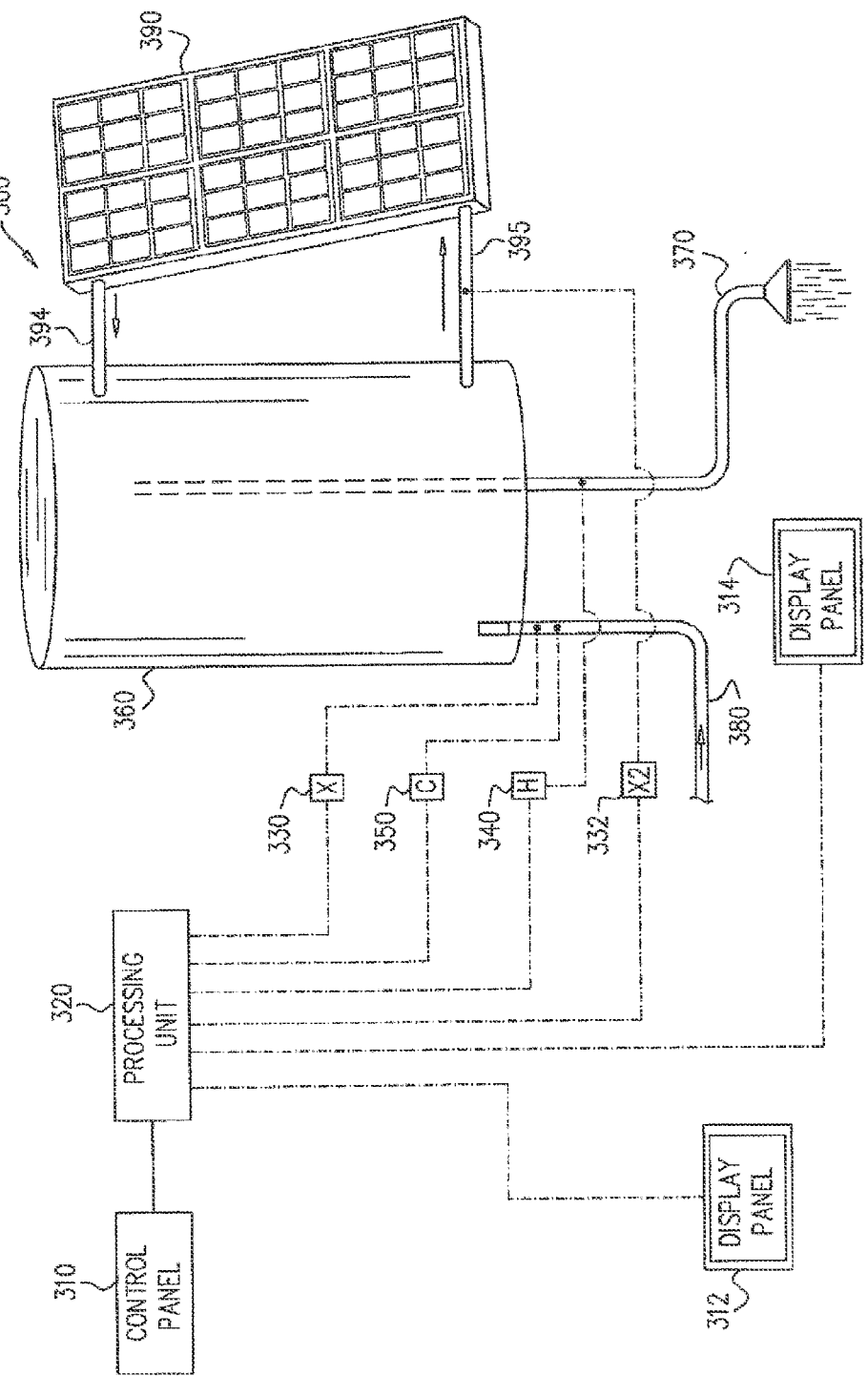
FIG. 3 is a pictorial depiction of a boiler system with solar panel, augmented with an exemplary configuration of the system of FIG. 1.

Another possible configuration is shown in FIG. 3. FIG. 3 depicts a hot water system with a solar water heating panel, augmented with an embodiment of the immediate system. Solar water heating (SWH) or solar hot water (SHW) systems comprise several innovations and many mature renewable energy technologies that have been well established for many years. SWH has been widely used in Australia, Austria, China, Cyprus, Greece, India, Israel, Japan and Turkey.

Passive systems rely on heat-driven convection or heat pipes to circulate water or heating fluid in the system. Passive solar water heating systems cost less and have extremely low or no maintenance, but the efficiency of a passive system is significantly lower than that of an active system. Overheating and freezing are major concerns. In some embodiments of the invention, sensors can indicate freezing and/or overheating. The processor can sound an alarm or issue an alert regarding the freezing or overheating. Automatic systems can prevent overheating by cutting power to the heating element of the boiler system, for example.

Active systems use one or more pumps to circulate water and/or heating fluid in the system. In some situations, water drawn from the boiler can be pumped into the solar panel, ostensibly to be heated, but where in fact the water is being cooled by the process. Based on sensor information, the system can instruct the pump to stop pumping water to the panels if the water exiting the solar panel is cooler than the water entering the panel. Likewise, other similar situations of energy wastage can similarly be prevented based on the sensor data and corresponding logic in the processor.

An exemplary hot water system 300 includes a boiler 360 coupled to a solar heating panel/collector 390 of a passive system. Solar panel 390 receives cool water from the lower regions of the boiler 360 which runs through the collectors of the solar panel and outputs the heated water back into an upper region of boiler 360. Here too, the system collects data from three sensors assembled on the boiler: a first temperature sensor (C) 350 measures the temperature of the water in the intake line 380; a second temperature sensor (H) 340 measures the temperature of the water in hot-water outlet pipe leading out of the boiler; and a flow meter (X) 330 which measures the flow rate of water moving through the cold-water intake line, into the boiler. In addition, a second flow meter (2X) 332 measures the flow rate of water running from the water boiler/boiler tank 60 to the collector 390 via a connecting pipe 395 which carries cooler water to the collector. A collector outlet pipe 395 carries (heated) water from the collector back to the boiler tank. Of course the second flow meter could be positioned in other places on the solar collector or connecting pipes, such as on the solar collector outlet pipe 394. In any of the aforementioned configurations the second flow meter (2X) 332 measures the flow of water passing through the solar collector.

In the immediate exemplary embodiment, a control panel 320 is operationally coupled to a processing unit 320. Exemplarily the control panel can be conveniently located in a house, possibly outside a family bathroom. The control panel allows users to program heating times, duration of a heating period and so forth. Further in the exemplary embodiment, a first display panel 312 is separate from the control panel. Exemplarily, first display panel 312 can be located in a family shower/bath area. Preferably, the panel is waterproof and otherwise protected from steam, humidity and other elements commonly found in a bathing area. The display can be designed and programmed to display current water and/or hot water usage as well as an approximation of remaining available hot water displayed as any appropriate value. For example, the remaining hot water can be displayed in liquid measurements, or, more preferably amount of remaining time left before all the hot water is used up, possibly an estimated number of bathing activities that can be accomplished with the remaining hot water. The display is configured to provide real-time estimates directly related to the usage at the time. Therefore, manipulation of the flow and/or hot to cold water mix ratio, will be reflected on the display. Exemplarily, lowering the flow of hot water will increase the displayed amount of available hot water.

A second, exemplary display panel 314 is also depicted. Potentially the second display can be located in the master bathroom or kitchen. Either way, users of hot water will similarly be able to gage how much hot water is available and plan or use the hot water accordingly.

Figure 4:
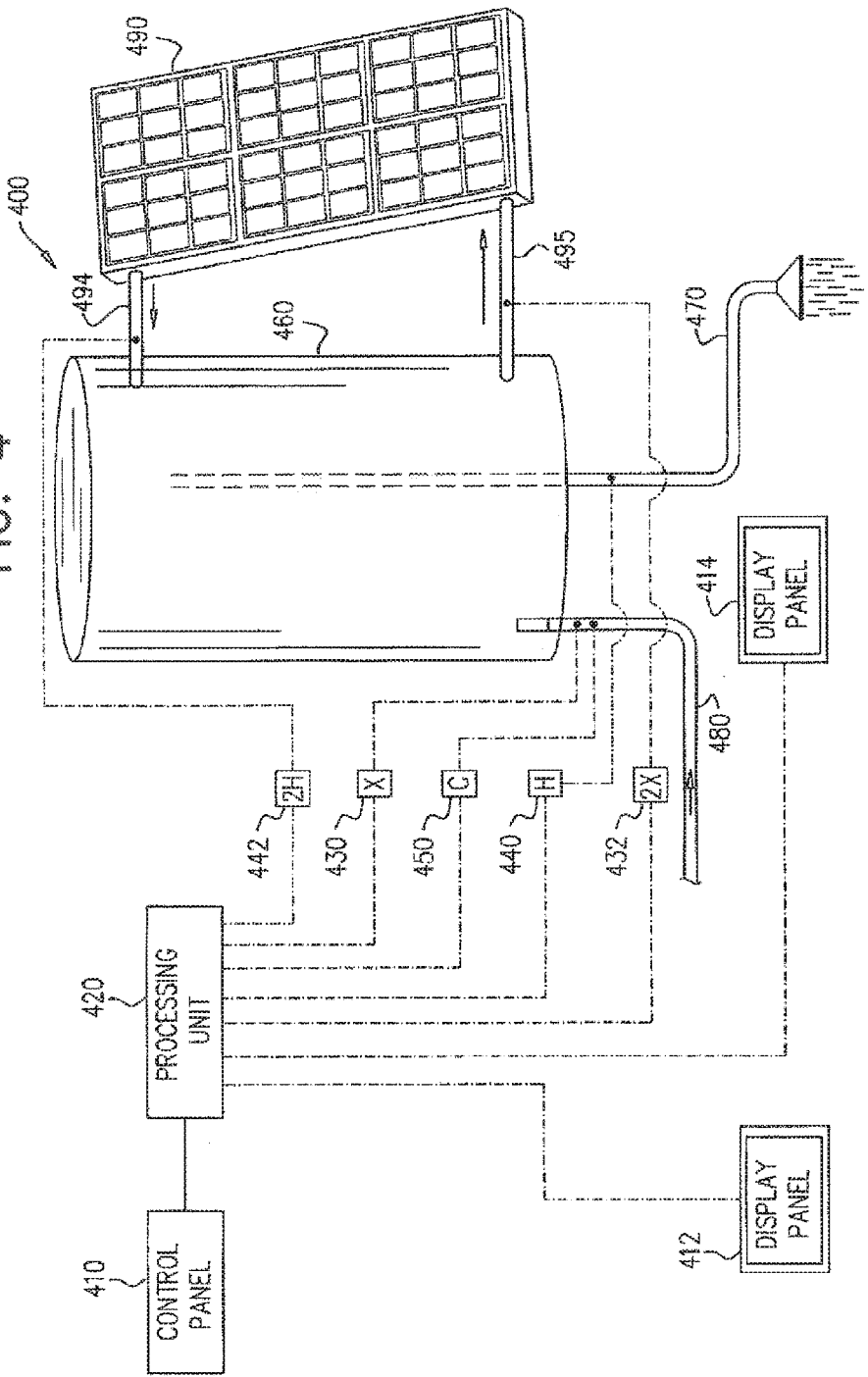
FIG. 4 is a pictorial depiction of a boiler system with solar panel, augmented with another exemplary configuration of the system of FIG. 1.

Yet another configuration is shown in FIG. 4 which depicts a system 400 similar to that of FIG. 3 with the single difference of an additional hot water/solar collector outlet TS (2H) 442. The solar collector outlet sensor (2H) 442 is adapted to measure the temperature of water flowing from the solar collector to the water boiler/boiler tank 60. The flow rate value received from flow meter 2X 332/432 indicates how efficiently the collector is heating the water. The speed at which water enters the collector is indicative of the relative heat the collector is collecting above the heat of the water entering the collector; the faster the flow of water into the collector, the hotter the collector (at least from a monitoring point of view). By adding an additional sensor, a more exact estimation can be made of the available hot water. Knowing how much hot water is entering the tank 460, and how hot the water actually is, improves the accuracy of the estimation algorithm. Furthermore, the additional sensor can also give a better indication of the efficiency of the heating element, and whether the element needs to be repaired or replaced.

Figure 5:
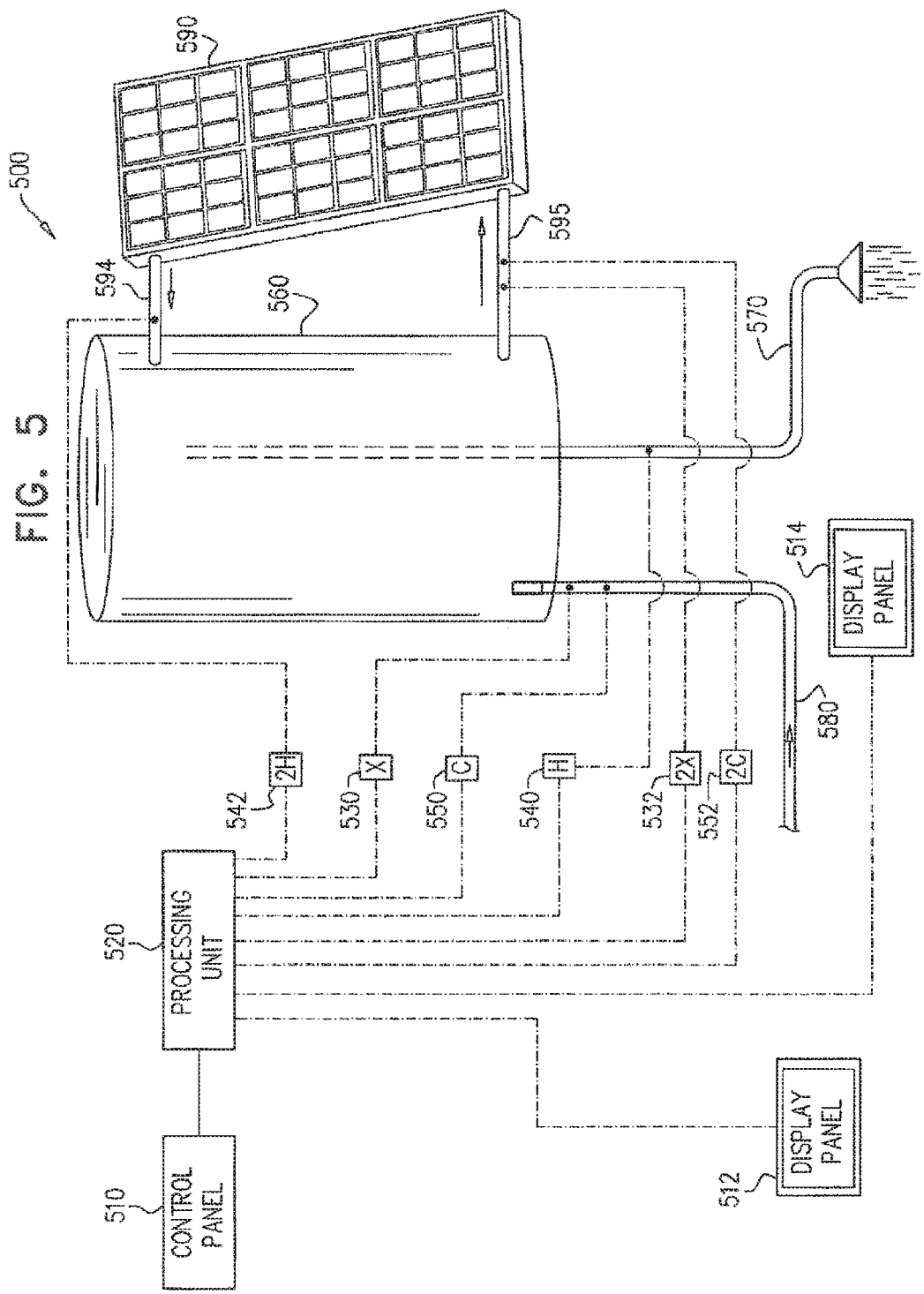
FIG. 5 is a pictorial depiction of a boiler system with solar panel, augmented with yet another exemplary configuration of the system of FIG. 1.

Yet another configuration is shown in FIG. 5 which depicts a system 500 similar to that of FIG. 4 with the single difference of an addition solar collector intake/inlet TS (2C) 552. The solar collector intake sensor is adapted to measure the temperature of water flowing from the water boiler/boiler tank 60 to the solar collector 390. The retrofit system of the immediate invention is non-invasive with regards to the existing hardware. No sensors are inserted into the boiler tank or collector. As a result, the exact temperature of the water in the boiler is largely unknown and merely estimated. Of course, the water temperature in the boiler tank itself differs from place to place. The hottest water is in contact with the boiler element, and is funneled up the boiler cone to the top of the tank. Cooler water descends to the bottom of the tank. By attaching TS 552 to the collector inlet pipe 595 the processor can more accurately determine the amount of hot water in the tank based on the additional information regarding the temperature of the cooler water in the tank. As above, the additional sensor can also give a better indication of the efficiency of the heating element, and whether the element needs to be repaired or replaced.

Of course, the configurations shown in FIGS. 3-5 are merely exemplary and other combinations or configurations can equally be applied. For example, a configuration with only a solar collector outlet sensor is envisioned, without the second flow meter. In another example, a solar collector outlet sensor and a solar collector intake sensor are included in the system configuration but not an additional flow meter. Numerous variations are possible.

Additional sources of temperature data can be attained from the boiler thermostat. Generally, a thermostat is set at a predefined temperature. When the water reaches the desired temperature (e.g. 65 degrees Celsius) the boiler element switches off. When the water cools to a temperature below a predefined differential (e.g. 5 degrees Celsius), the boiler element switches back on. The thermostat information provides the processor 120/220/320/420/520 with an indication of a temperature range sensed by the thermostat. For example, if a thermostat is set to heat the water to 65° C. with a differential of 10° C., then if the thermostat is active the processor knows that the temperature inside the boiler tank (at least where the thermostat sensor is situated) is below 65° C.; if the thermostat subsequently deactivates then the temperature is between 65° C. and 55° C.; when the thermostat subsequently re-activates then the processor knows that the temperature is rising between 55° C. and 65° C.

In an additional exemplary embodiment, a photovoltaic cell (not shown) can be part of the retrofit system, attached to or near the solar collectors. The photovoltaic cell or solar cell can provide data regarding efficiency of the solar collectors (e.g. the amount of energy produced by the PV is an indication of how the solar collectors should be heating the water). Furthermore, the solar cell can provide additional 'clean' energy for powering the forecasting system of the immediate invention. In this manner, the system draws very little, if any, additional power from the power grid. As such, the system can work independently of a power grid, such as in a remote location or in a caravan/RV/trailer, on a boat or ship. The water is heated by a solar panel and the retrofit system is powered by the PV cell.

Figure 6:
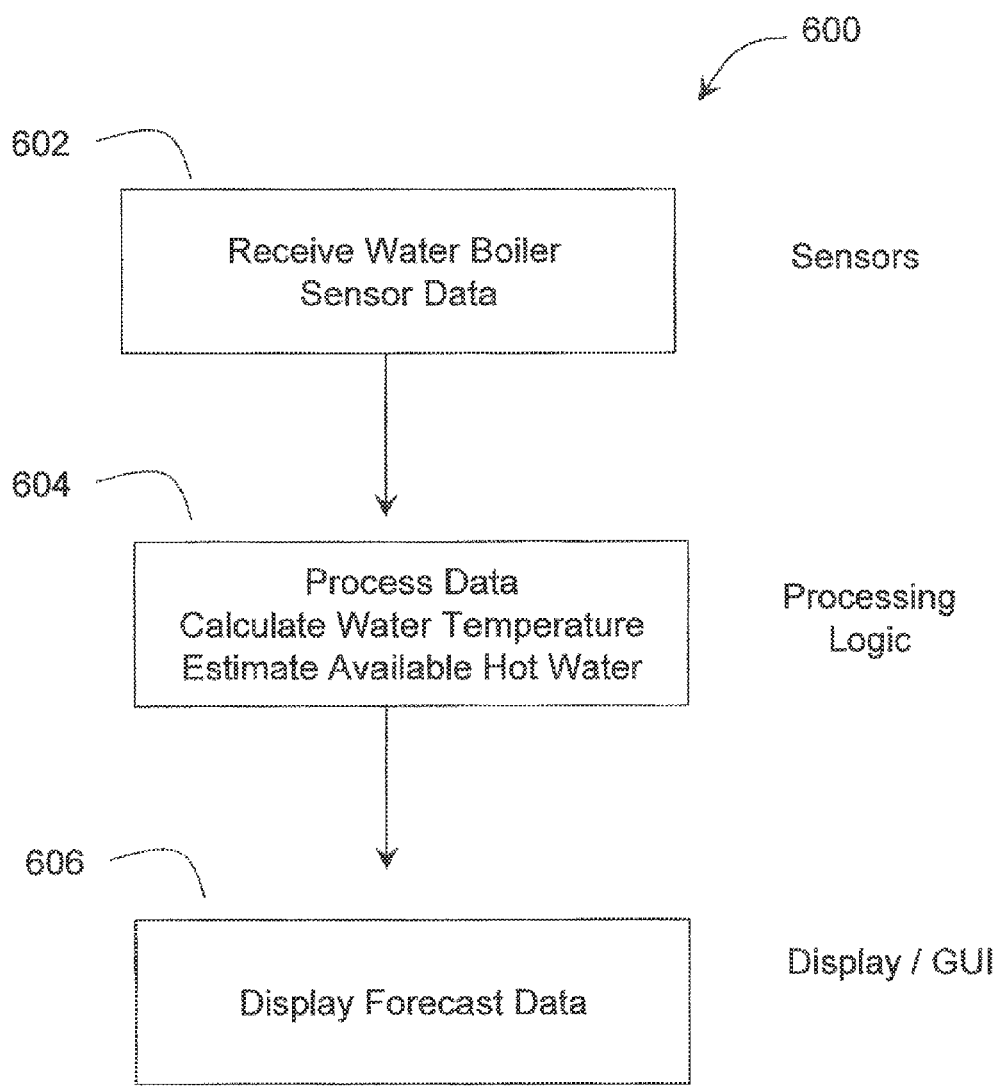
FIG. 6 is a main flow diagram of the innovative method of the immediate invention.

FIG. 6 displays a main flow diagram 600 of the immediate invention. In step 602 of the flow, the forecast system receives sensor data. In step 604 the sensor data is processed to calculate an approximate amount of available hot water. In step 606 the calculated values are displayed in various forms (e.g. as a liquid quantity, as an amount of hot-water activities that can be accomplished, as a function of time, as in how long the hot water will last before it runs out, etc.).

Figure 7:
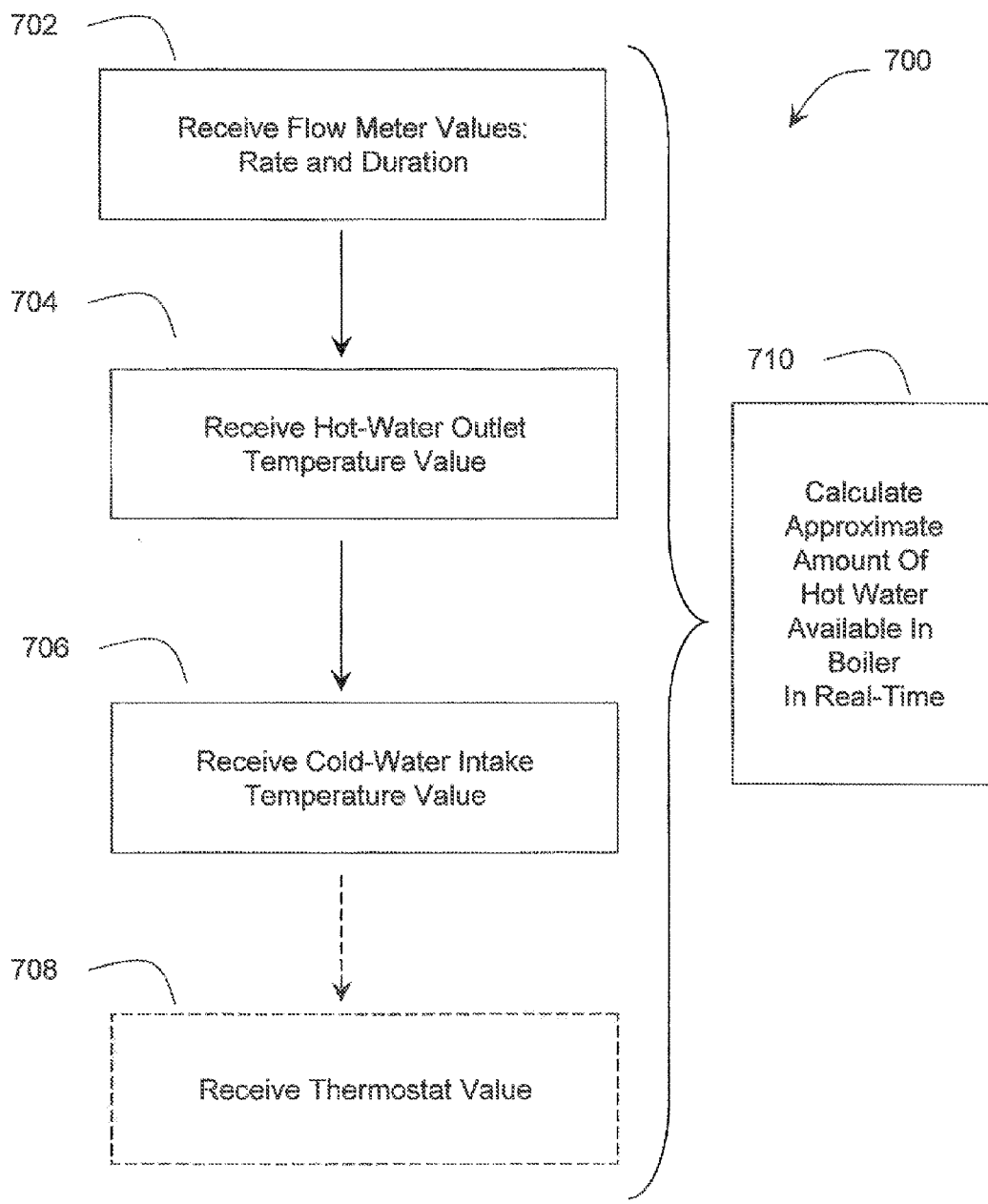
FIG. 7 is a flow diagram of data sub routine.

FIG. 7 illustrates a more detailed flow diagram 700 of a subroutine for receiving sensor data. In step 702 a flow meter measurement/value/data is received. In some embodiments, the measurement/data includes a flow rate value and a flow duration value. In step 704, a hot-water outlet temperature measurement, of water in a boiler outlet pipe, is received. In step 706, a cold-water intake temperature measurement, of water in a boiler intake pipe, is received. In some embodiments of the system, a thermostat value is received in step 708. In step 710, the sensor data is used to calculate an approximate amount of hot-water available in the boiler tank, or estimate the same—in real time.

Figure 8:
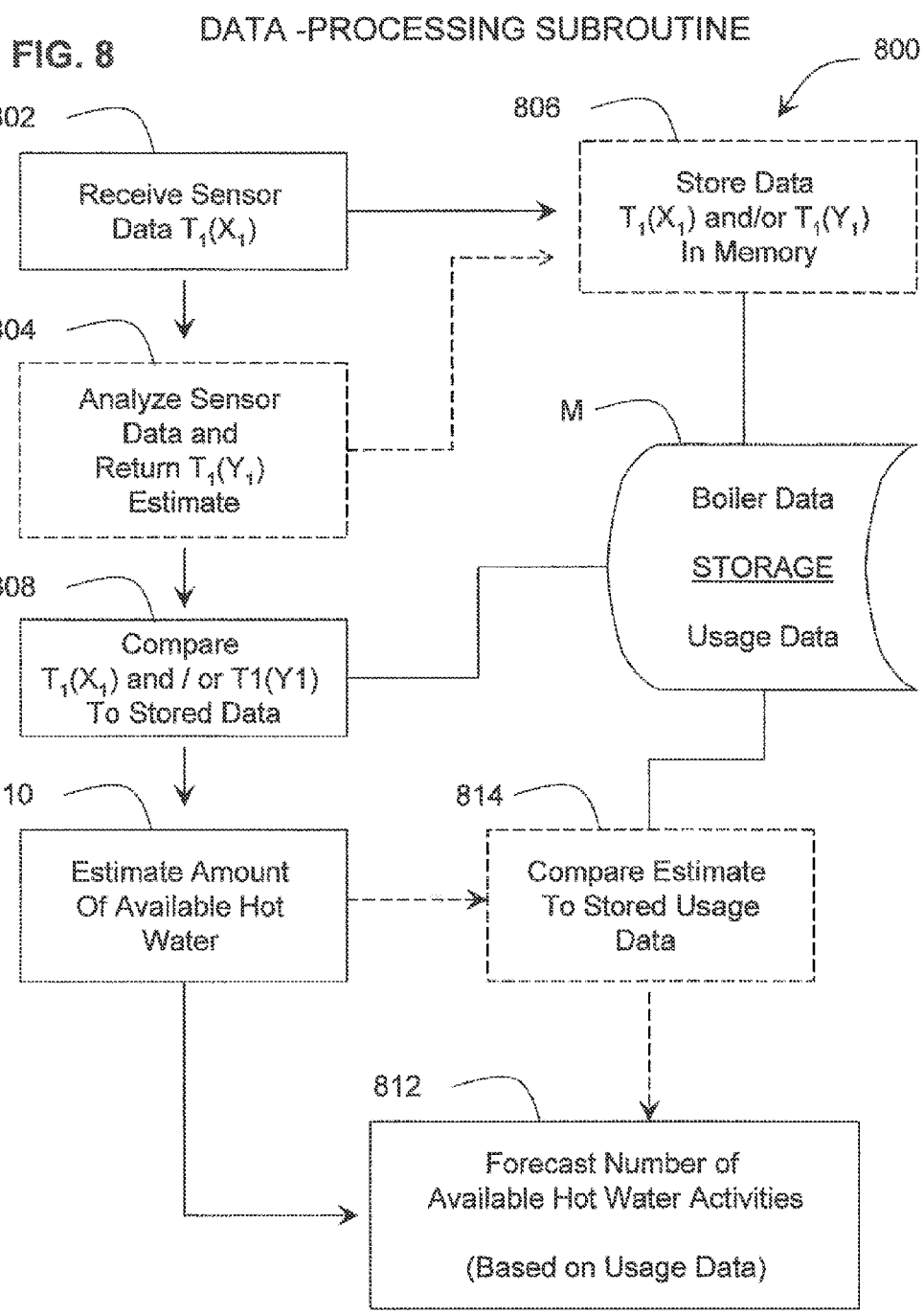
FIG. 8 is a flow diagram of a data processing subroutine.

FIG. 8 illustrates an exemplary data processing subroutine in a flow chart 800. In step 802, the system receives sensor data ($X_1$) for a given period of time ($T_1$). The sensor data is substantially the same as the sensor data described in flow diagram 700 of FIG. 7. In step 804 the sensor data $T_1(X_1)$ is analyzed by the processing unit and an estimated amount of available hot-water $T_1(Y_1)$ is calculated based on the data. In some embodiments step 804 is skipped. In some embodiments, the received sensor data $T_1(X_1)$ is stored in a memory/storage unit M (e.g. a transient or non-transient storage medium or combination thereof) in step 806. In other embodiments, the estimate $T_1(Y_1)$ is stored in memory M in step 806. In still other embodiments both the received data $T_1(X_1)$ and the calculated estimate $T_1(Y_1)$ are both stored in memory M.

In all of the aforementioned configurations, the data for the current time period ($T_1$) is compared to the relevant stored data in step 808. Based on the comparative data and/or other calculations and algorithms applied to the combined data, a more accurate estimate of available hot water is received in step 810. For example, the usage data for ($T_1$), or more likely for the time period of ($T_1$-$T_n$) can be very similar historical data ($T_p$-$T_r$) from, say, three days before. The historical data from three days ago also includes the actual amount of hot water that was de facto available. With this knowledge, the algorithm provides a higher likelihood that the estimate is correct. If the estimate is found to be approximately correct once again for the ($T_1$-$T_n$) time period, then the algorithm will provide a higher rating for this estimate, as the estimate has been proven correct on two occasions. The more information gathered and analyzed, the better and more exact the approximations will be.

In some embodiments, the amount of estimated available hot-water is then processed into various user-friendly formats and displayed in step 812. Some formats include: a number of hot water activities available (e.g. 6 showers or 2 baths or 1 bath & 3 showers or 1 dishwasher load and 1 laundry load or 2 showers and 1 sink of dishes, etc.); an amount of time hot water would be available at a predetermined flow rate; an amount of time before sufficient water is heated to a sufficient temperature for a requested number of hot-water activities and the like. The displayed forecast data, in step 812 can be based on predefined values or amounts for each activity. For example, the national average for hot water usage during a shower is between 6-8 Gallons in the US.

In other embodiments, the estimate received in step 810 is compared to stored usage data, in step 814. Usage data includes various pieces of useful information stored over time. The usage data relates, as the name implies, to the household usage of water, for that particular household. For example, usage data can include family patterns of hot water usage which is learned by an adaptive learning algorithm over time.

One example of possible usage data is the distinction between adult usage and child usage; a child may shower for longer or earlier in the evening, whereas an adult may have a shorter shower and/or later at night. An adult bath may include more water in general and more hot-water in particular, whereas a child bath usually is not as hot or as full.

Usage data can be stored in storage M and patterns relating to usage will emerge over time. The stored data (relating to distinct usage activities, e.g. how much hot water was used for how long at what time of the day, etc.) and/or extrapolated patterns can be accessed, in step 814, and compared to the estimate from step 810. Based on the usage pattern and/or other usage data the system or processing unit can provide a more accurate forecast of available hot water activities in step 812. In these embodiments, the forecast data is displayed in user friendly formats based on stored usage data specific to the particular household.

In some embodiments, the system includes a feedback procedure. For example, after a hot water activity has been registered, the processing unit can display a question on the control panel, to verify what type of hot water activity has just occurred. For example, the question can be, "Was a child's bath drawn in the last five minutes?" The question reflects the system's best guess at what the hot water activity was. Based on the user response entered on the control panel, the system is able to improve the knowledge base. The more feedback provided, the better the system becomes at identifying the type of activity sensed.

In some embodiments, the system is electrically coupled to an offsite centralized system. The connection may be via wired or wireless means well known in the art. In such an embodiment, the processing unit 120/220 further includes long distance communication capabilities. The communication may be enabled via a wired or wireless connection to a local router (i.e. as part of a LAN or WLAN). Alternatively, the system may include an autonomous and/or independent communications capabilities such as cellular and/or satellite communications capabilities. The communications component is generally termed a network interface.

The system may, based on specific permissions given by the owners, transmit various data to the centralized system for storage and analysis. The centralized/offsite system may analyze the transmitted data and offer to provide remote assistance. For example, the offsite system (whether manned, automated or a combination of both) may recognize a pattern in the transmitted data which indicates a water leak, or a boiler element which is no longer working efficiently etc. The offsite system may provide alerts or offer advice to improve the household hot-water system.

Figure 9:
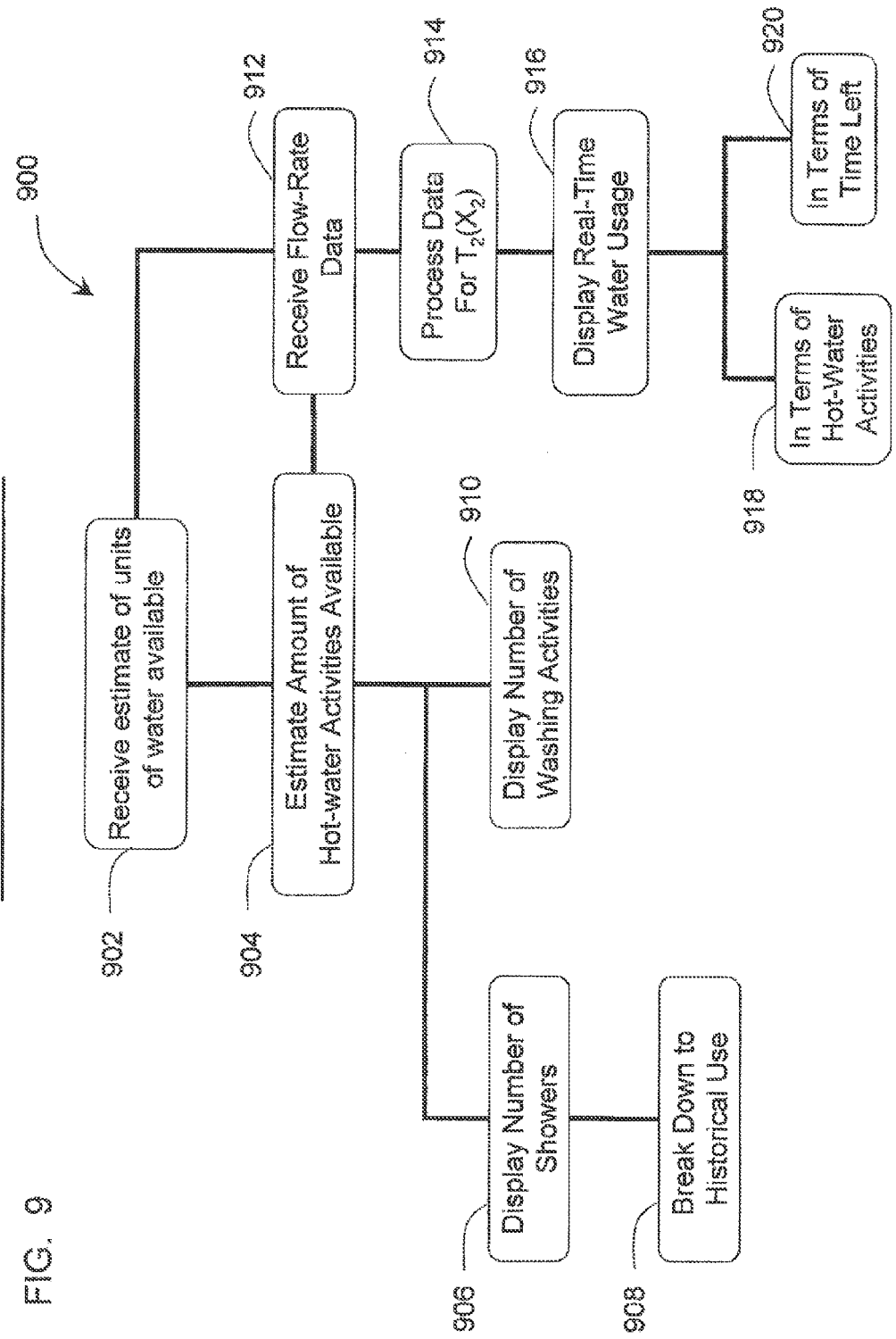
FIG. 9 is a flow diagram of a display routine.

FIG. 9 illustrates a flow diagram 900 relating to a display subroutine. The processing unit is operationally coupled to the display panel. In some embodiments, the processing unit includes a computer program product which is embodied on a non-transitory storage medium and executed via a processor of the processing unit. Preferably the system includes at least one display panel. In some systems, two or more display panels may be included. For example, a main display unit may be located in a central place selected for household use, e.g. outside a main bathroom. The main display/control panel may be used to program the hot-water system or view the amount of hot water or hot-water activities currently available, or the amount of time required before the requisite amount of hot water is available. In preferred embodiments, a display panel is located inside the bathing area. The display panel inside the bathing area is adapted to display real-time values of available hot-water and in particular, how the user's usage of the hot-water affects availability. For example, a user is able to see, during the course of a shower, how much hot-water is being utilized and how much hot water remains in the system at the time.

In preferred embodiments of the system, in step 902, the processing unit receives the value/data of the estimated amount of available hot water, for example, as calculated in step 810 or 814 of flow 800 in FIG. 8. In step 904, the estimated amount or number of hot water activities which are available is displayed on the display panel. In step 906 the number of bathing activities (e.g. showers, bathes) is displayed on the display panel (e.g. the main display panel outside the bathroom). In step 908 a break-down display of the bathing activities available is shown. For example, based on historical use or predefined values, a number of adult and/or child bathing activities is displayed (examples have been mentioned above). In step 910 the number of washing activities is displayed. Washing activities may include dishwasher use, laundry machine use, sink use for washing a load of dished etc. The control/display panel may include functional buttons for changing display modes, for example, between bathing and washing activities. Alternatively and/or additionally, a combination mode may exist and/or a selection function and the like.

In step 912, which may subsequent or simultaneous to step 904, processing unit receives flow rate data from the flow meter. The flow rate data (and possibly other sensor data) is processed in step 914 resulting in a new data ($X_2$) for a new time period ($T_2$). In step 916 the real-time display of available water is updated. For example, the display panel in the bathing area will show how much hot water is left throughout the duration of the bating activity, where the display is updated periodically. Alternatively and/or additionally, the main display (or any display for that matter), may show an updated number of bathing or washing (or other hot-water) activities available, based on the new data $T_2(X_2)$ (step 918). Alternatively and/or additionally, the display may show an amount of time remaining before the hot water runs out (step 920). Various additional display options have been discussed elsewhere.

Figure 10:
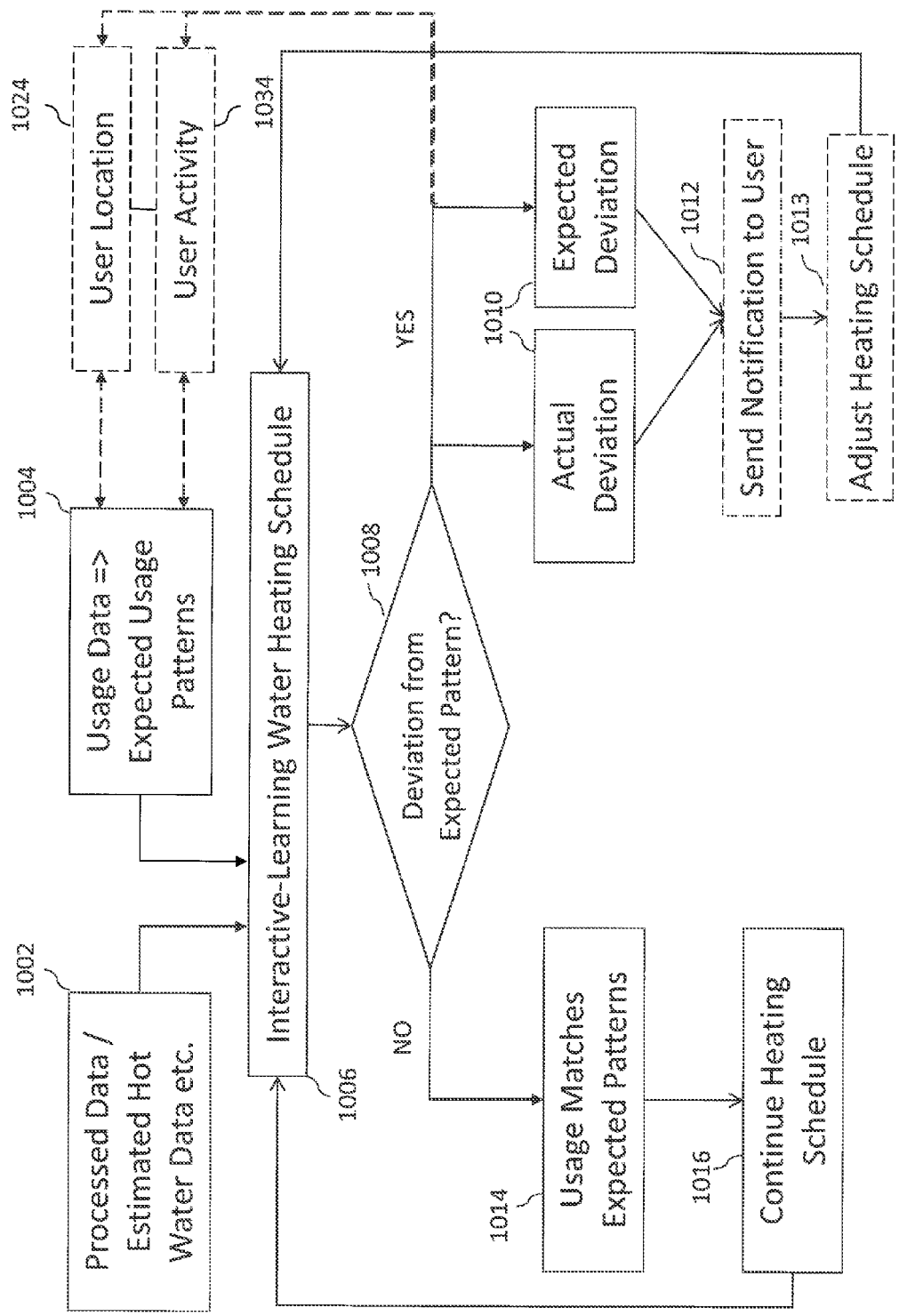
FIG. 10 is a main flow diagram of the innovative method of the immediate invention.
Figure 12:
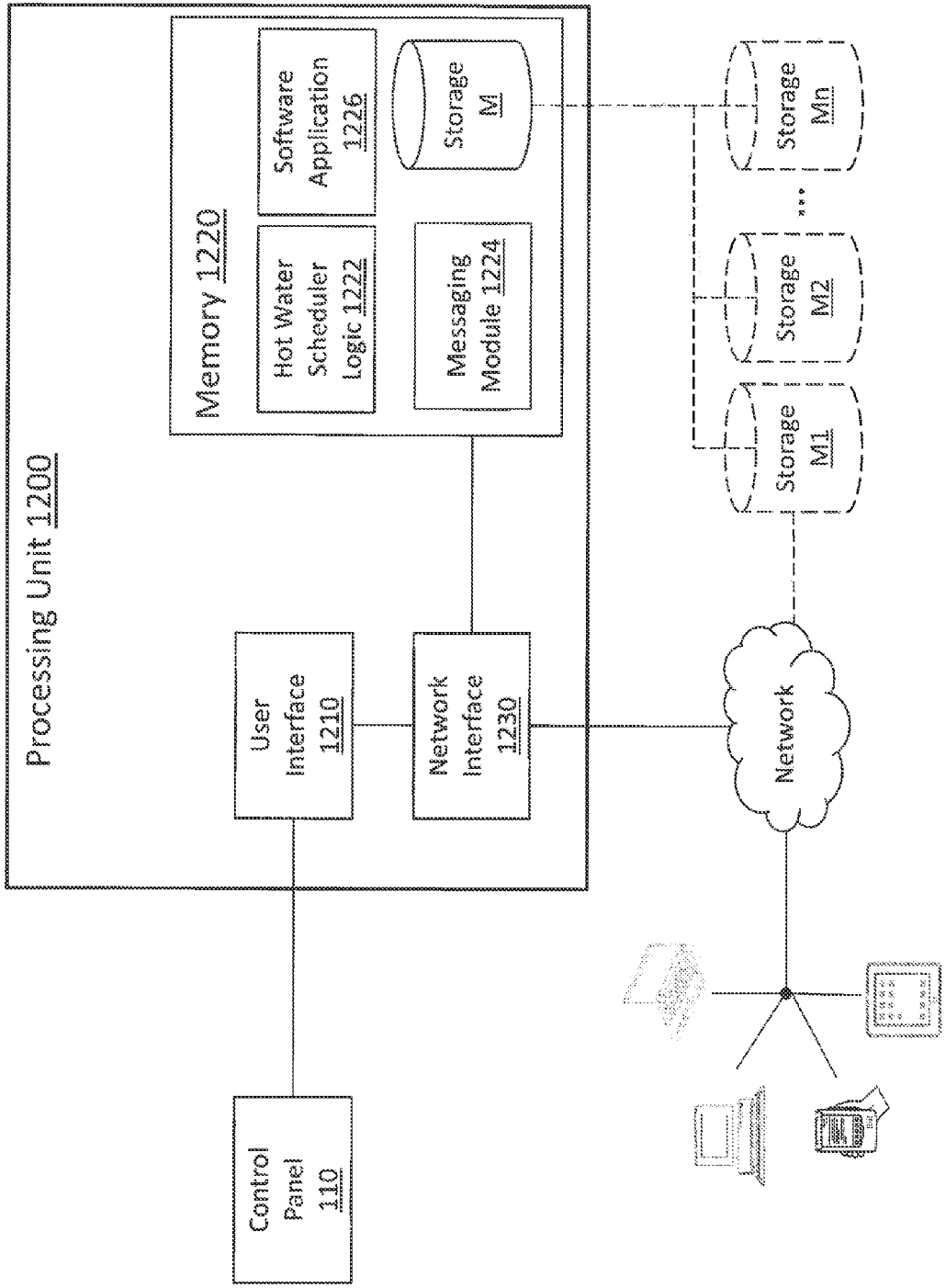
FIG. 12 is a block diagram of an exemplary processing unit that is adapted to effect the process of FIG. 10.

FIG. 10 depicts a second data-processing flow chart, indicative of the innovative process of the immediate invention. FIG. 12 depicts an exemplary processing unit 1200 that is adapted to effect the process of FIG. 10. Only components that are germane to the invention are depicted in FIG. 12. In Step 1002, sensor data is processed, thereby providing raw data such as the estimated amount of hot water currently available. The process may be similar to the process described in flow diagram 800 in FIG. 8 or may be a different process resulting in at least the aforementioned raw data (i.e. an estimate of the amount of available water which has been heated to within a predefined/given range of temperatures). In step 1004, the system records, stores and/or processes usage data over time. As more and more usage data is recorded/stored, patterns begin to emerge from the data. These patterns are termed herein 'usage patterns' and are believed to be indicative of habits, routines, predictable behavior of the system users. The processed data and usage data is store in Storage medium M located in, or electrically coupled to, a Memory 1220 of processing unit 1200. Alternatively or additionally, the storage medium or additional storage media (mediums) M1 . . . Mn may be collocated or remotely located.

The ability to identify usage patterns is not straight forward. The logic for discerning hot water activities and estimating availability of hot water has been discussed above. Discerning usage patterns entails taking the available knowledge base and applying algorithms that search for "larger" patterns, more inclusive patterns where various activities are identified as relating to each other and/or even having a cause and effect relationship.

Various types of patterns may exist. For example, a 'family pattern' may exist whereby the entire family has a loosely defined schedule for bathing in the morning or evening. A 'washing day pattern' may exist whereby a particular day of the week is identified as including a concentrated number of washing loads, above and beyond the norm. This day may be the husband's or wife's day off from work, or the day that there is domestic help in the house, etc. When a general usage pattern is discerned, obviously within an acceptable statistical deviation from the norm, the pattern can be applied to other situations. Using the washing day example, if washing day is usually Tuesday, but the system detects the "washing day pattern" on a Wednesday, the system can determine, that the washing day activities have changed from one day to another (probably a one-time-off situation). As a result of this determination, the heating system will be employed accordingly.

Expected usage patterns—an expected pattern refers to a prediction, based on historical data, that a particular usage pattern will take place at a particular time (day of the week, hour of the day etc.)

Deviation—a deviation refers to an event that takes place, which is not expected to happen, in contrast to the event or events that are predicted to happen based on an expected pattern or patterns. The deviation may be an active event or a passive event. Once again using the 'washing day pattern', an example of a passive event is provided. On Tuesday, the system expects at least four loads of washing to be done between the hours of 9 am and 2 pm. In preparation for this event, sufficient hot water for at least one load of washing is heated by 9 am. If by 10 am or 10:30 am, no washing load has been detected, the system registers a passive deviation (or the possibility thereof), where something that should have happened did not happen. An example of an active deviation, is what happens on Wednesday. When a first washing load is detected at 9 am on Wednesday morning, the system registers the possibility of an unexpected washing day pattern. When a second load is subsequently registered, the likelihood of a washing pattern increases and the heating systems begins to make provisions for additional expected loads of washing, based on the washing day usage pattern.

Indicators—the term Indicator is used herein to refer to an event, situation, circumstance, location etc. that has causality and bearing on a usage pattern and/or an expected pattern. With expected patterns and deviations from those patterns, there is a statistical relationship between a set of events. For example, if two laundry loads happen in succession, there is a statistical likelihood that at least another two will happen thereafter. If this happens on a Tuesday, the statistical likelihood is even greater, based on the historical pattern discussed above. Indicators are events etc. that cause a certain usage pattern to happen or to not happen.

For example, once again using the washing day pattern, whenever the washing day patterns occurs, there is an additional, unexpected event that always (or almost always) occurs with that pattern. The unexpected event, for example, is the detection of a particular cellphone wireless signal in the house on a Tuesday when at least four loads of washing are done (the cellphone belongs to the domestic worker, for example). The system can link the unexpected event to the particular pattern once a statistical threshold has been reached (e.g. if the cellphone has been detected on three consecutive weeks on washing day and even more so if the cellphone has been detected when the washing day pattern takes place on an unexpected day). Once an indicator has been determined to cause a particular usage pattern to occur, the system can use the indicator to predict a usage pattern.

In some instances, a particular indicator can infer something related to part of pattern, but not the entire pattern. For example, if the system has linked a particular cellphone signal to a specific member of a family, the system can deduce whether that family member is home at an expected time or not. If one member of the family is not at home, then the family pattern will be changed (this is a partial deviation). For example, instead of six showers between the hours of 7 pm and 9 pm, there will only be five showers. The more detailed the knowledge base, the more accurate the system can predict the deviation.

Based on the above, the types of indicators can be divided into two general categories: User Location and User Activity. User location refers to any knowledge that is based on the location of the user. The location may be detected by internal sensors in the house, wireless signal detection and/or remote location information such as from GPS devices in smartphones, cars etc. User activity refers to meetings, recreation, sport activities etc. that can be determined by the system based on digital schedules (e.g. online appointment book), travel bookings and/or user location (the gym, swimming pool etc.). It is made clear that both the initial and ongoing extrapolation of [expected] usage patterns as well as deviations from those patterns can be extrapolated from the user location and user activity. That is to say that in Step 1004 the system references User Location 1024 and/or User Activity 1034 in order to extrapolate usage patterns. Detection of deviations is discussed below.

Feedback—The system knowledge base can only record data and extrapolate data. To improve the quality of the data stored in the knowledge base, the system can request feedback from users. Feedback communications are handled by a User Interface 1210 which is included in the processing unit. Based on the feedback responses, the system can know how to act (heat more water, heat less water etc. and/or can further improve the knowledge base and algorithm based deductions. Feedback can be provided via control panel 210/110 by inputting commands, instructions, data or responses to queries.

Alternatively or additionally, the feedback may be elicited from a user in response to an automated query sent to the user. For example, the processing unit, having a messaging capability, can send an email, SMS message or recorded message, etc. to the user via a Network Interface 1230. The network interface is similar to the local router and/or cellular communications components discussed above. Exemplarily, the processing unit includes a messaging module 1224 stored in Memory 1220.

Messaging module 1224 includes computer-readable instructions for composing a query, selecting a method of communication, selecting an address (cellphone number, email address, mobile application ID etc.) and sending the communication. Further, the module includes programming for receiving a response via the selected communication medium, processing the contents of the response and instructing the processing unit based on the contents of the response. For example, the messaging module can send a query in an SMS message to a user asking whether the user will be needing a shower when returning home. The user can reply with a yes or no answer which is accordingly received and processed by the processing unit.

In some embodiments, the innovative system includes a software application 1226 that can be installed on a computing device such as a Personal Computer, a laptop computer, a tablet computer, a smartphone, a PDA and the like. The software application, for example a mobile app, can facilitate communication between the system and the user. For example, the mobile app, when running on a smartphone, can send location information (GPS, cellular tower triangulation etc.) to the water heating system to improve the ability of the system to predict deviations from the expected patterns and the like.

In step 1006 the innovative Interactive Learning Water Heating Scheduler (ILHS) uses adaptive algorithms in an initial stage to build a heating schedule which is then adjusted in real-time based on user interaction. The data from steps 1002 and 1004 is processed into a heating schedule. The approximate amount of current hot water is known from step 1002 and various usage patterns are known or learned based on usage history. The historical usage data is processed and usage patterns are extrapolated in step 1004. A heating schedule is created from those variables in step 1006.

The heating schedule is based on an expected usage pattern or set of expected usage patterns. In step 1006, the heating schedule is either adjusted or not adjusted based on user interaction and/or input. If a deviation is detected, or anticipated, then the heating schedule is updated. If no deviation is detected or expected, then the schedule remains unchanged.

The user interaction that affects the schedule may be an active interaction or even a passive interaction. For example, a couple has a usage history which suggests that the husband and wife will each take a short shower between 9 pm and 10 pm. The system determines that, based on the husband's cell phone location, the husband is out of town and will not be home that night. The ILHS adjusts the heating schedule so that sufficient water for only one shower is heated. In this manner, the interaction with the user (the husband) is passive, i.e. without the husband's input.

In a slight variation of the above example, the system sends a message prompt asking the husband if he is indeed coming home or not. The husband responds "yes" or "no" or gives a particular time of arrival which the system processes and adjusts the heating schedule accordingly. This type of interaction is reactive, i.e. providing input in response to a system query.

An example of a clearly active (proactive) interaction with the system, the user informs the system of a schedule change. A number of different input options are available. Some examples include, but are in no way limited to, sending a text message to the system; inputting the change into a control panel; using a dedicated mobile app from a handheld/portable computer; using a dedicated computer application from a desktop; synchronizing a digital calendar with the system etc.

In another exemplary interaction, the usage pattern is followed within the predefined boundaries (i.e. no discernable deviation from the pattern). In such a case, the schedule is not adjusted, based on the user interaction/input.

In step 1008, the heating schedule is updated or left alone by the processor depending on whether deviations from the expected pattern are detected or predicted. In some cases, the expected usage pattern is compared with the actual usage based on sensor readings (e.g. flow meter readings, temperature readings etc. discussed above) in order to detect whether a deviation has occurred.

In other cases, the processor updates or changes the schedule based on predicted deviations from the schedule. Generally, an Indicator of some kind is detected by the system and, based on that indicator, the system determines or at least suspects that there will be a future deviation from the expected pattern.

The system can predict a deviation from the schedule based on many different factors or Indicators. One exemplary factor is the location of the user (User Location 1024). If the user is in the expected location, then there is no deviation. If the user is not in the expected location then there is or may be a deviation from the schedule. Another potential indicator is a particular user activity (User Activity 1034), for example, that a user always showers after coming back from the basketball court or after a run. The cellphone GPS could show that the user is at the basketball court for at least a predetermined amount of time (e.g. long enough to get sweaty and need a shower). Wearable technologies, such as a SmartWatch, that monitor vitals and can transmit increased pulse rate etc. that can provide an indication of running or some other sports activity.

When the processor detects that the user is working out then the processor can send a query to the user, asking whether to prepare water for a hot shower or not. One example of making a determination based on both a User Location 1024 as well as a User Activity 1034 is when a user is exercising (User Activity detected e.g. by SmartWatch) in a gym (User Location, detected e.g. by smartphone GPS) then the system knows that the user will not need to shower at home because they always shower at the gym. Any relevant activity or event can trigger an automatic or semi-automatic (e.g. send a query) change to the schedule (in step 1006).

In step 1010 a deviation from the expected pattern is detected. In one instance the deviation is an actual usage that deviates from the expected pattern. In another instance, the deviation may be a predicted deviation, based on an Indicator of some kind. In a third instance, a current deviation coupled with one or more indicators results in the processor assessing that a deviation from the expected pattern is taking place.

Deviations can happen in many different ways. For example, an unexpected (i.e. out of pattern) bath, shower, dishwasher cycle etc., is detected. This will register as a current usage which is out-of-pattern and therefore a deviation. In the examples discussed above, the system can predict a deviation from the schedule based on the location of the user as an Indicator. If a user is supposed to be en route to his house (e.g. the car GPS system is supposed to report that the car is travelling home), but is actually still at the office (e.g. based on car GPS, personal cell phone GPS, user logged in at the office etc.) then the system predicts a future deviation.

In one embodiment, when a deviation (current or predicted) is detected in step 1010, the system sends a query or notification to the user in step 1012. If the user responds to the automated query then the heating schedule is adjusted (or not adjusted) according to the user response in step 1013 or the step of adjusting the heating schedule is skipped and no change is made (go back to Step 1006). If the user does not respond then a predefined results occurs. The predefined result may be, for example, to do nothing (Go back to step 1006). Alternatively, the predefined result may be, for example, to send a second notification either to the same user or to another user (e.g. send query to wife if husband does not respond). A third exemplary result may be to adjust the heating schedule based on the predicted or actual deviation. In some instances, the processor may be programmed with instruction for applying historical data to the current situation, i.e. a learning program or processing unit. Other options for responses may include any combinations of the aforementioned actions.

In an alternative embodiment, when the processor detects a deviation in step 1010, the system responds automatically to the detected deviation without sending notification. A system of the immediate embodiment may not include a messaging capability (possibly lacking the hardware necessary, the software or both), and as a result does not send out any type of notification. In such an embodiment, once a deviation is detected, the heating schedule (controlled by the processor based on computer-readable instructions stored on a non-volatile storage medium) is automatically adjusted in step 1013. The system goes back to step 1006 in a recursive manner.

In step 1014, following step 1008, the expected pattern (actual or predicted) is followed (e.g. within a predefined, statistically acceptable deviation). In such a case the heating schedule continues unchanged in step 1016. The system goes back to step 1006 in a recursive manner.

In the exemplary embodiment of the flow chart 1000 depicted in the Figure, the system periodically checks whether or not the schedule is being followed. In other envisioned embodiments, the system may be prompted by an external source which is tasked with detecting schedule changes. One example of such a system may be a work calendar which may be programmed to send a message to the heating system if any meetings are scheduled after 6 pm (or any other type of specified programming). This type of system would be much more passive than the system described with reference to flow chart 1000.

Figure 11:
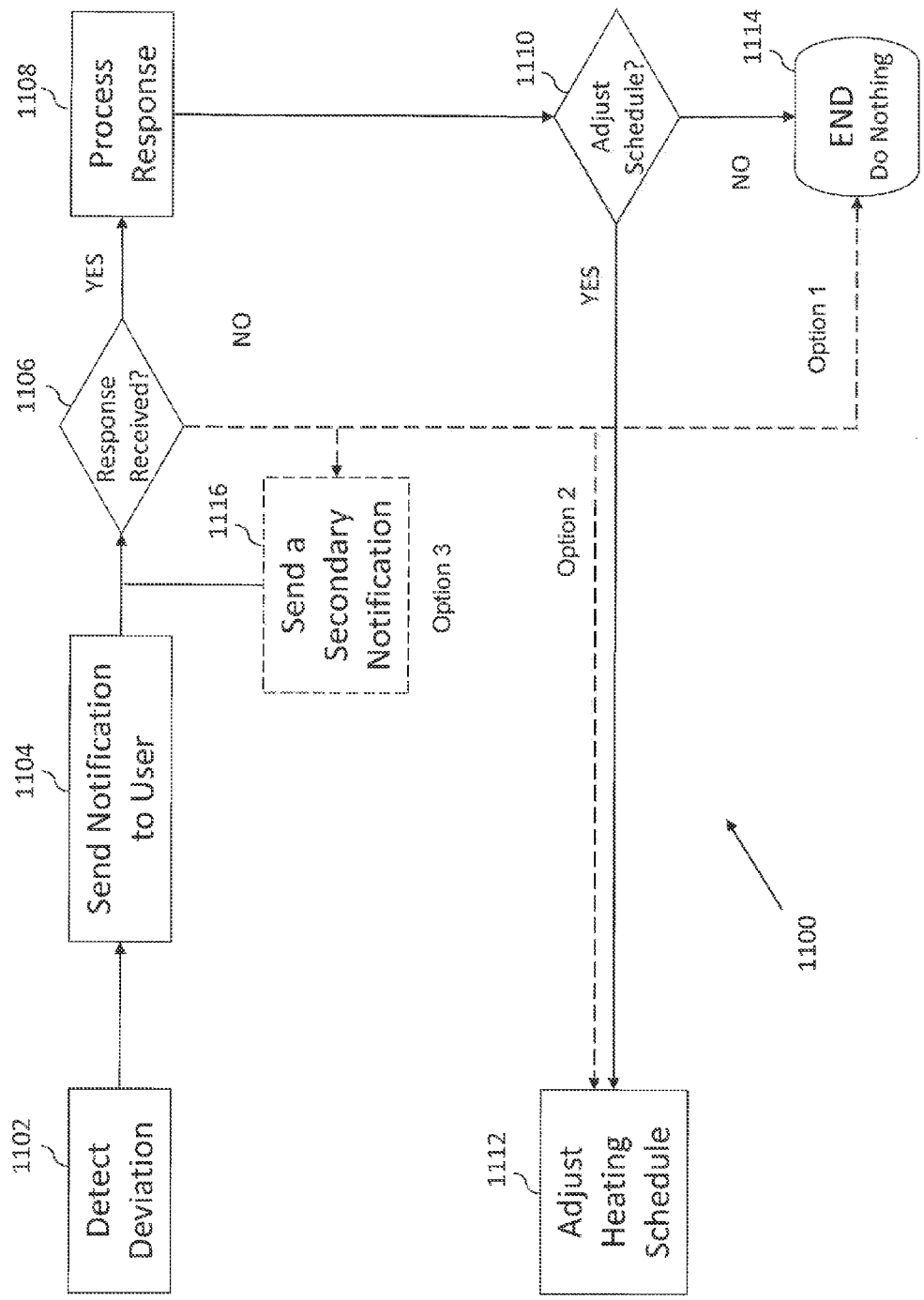
FIG. 11 is a flow diagram of a second data processing subroutine on the immediate innovation.

FIG. 11 depicts a flow chart of an exemplary feedback process 1100. In step 1102 a deviation is detected. Step 1104 includes sending a feedback request (e.g. a message, a query, or a notification, send electronically) to the user after detecting the deviation and prior to adjusting the heating schedule. In Step 1106 the system processing unit checks whether a feedback response has been receive from the user. The processor allows a predetermined amount of time to pass before determining taking further action or making a decision not to take further action.

If a feedback response is received within the allotted time, then the response is processed in Step 1108. In Step 1110 the processor determines, based on the response, whether to adjust the heating schedule or not. If the response indicates that a change is needed in the schedule, then in Step 1112, the heating schedule is adjusted. If the response indicates that no change to the schedule is needed, then in Step 1114, the feedback process terminates without effecting any change on the heating schedule (this is equivalent to skipping Step 1013 in the process depicted in FIG. 10).

If a feedback response is not received, then once the predetermined time has elapsed the processor can be programmed to effect one of three optional responses (also discussed above):

Option 1—Do nothing. If the system does not receive a response then no action is taken and the feedback process terminates in Step 1114. That is to say that step 1112, the step of adjusting the heating schedule is skipped after a predetermined time has lapsed prior to receiving a feedback response to the feedback request.

Option 2—Adjust the heating schedule. If the system does not receive a response, then the step of adjusting the heating schedule (Step 1112) is performed after a predetermined time has lapsed prior to receiving a feedback response to the feedback request.

Option 3—Step 1116 includes sending a secondary request after a predetermined time has lapsed prior to receiving a feedback response to the feedback request. The secondary request may be a second feedback request sent to the same user. Alternatively, the secondary request may be a second feedback request sent to a second user who is related to the first user. For example, if a first query message is sent to the husband and no response is received (within the allotted time) then the system sends a second query, this time to the wife, asking about the husband. If a response to the secondary request is received then the process resumes from Step 1108. If no response is received then any of the three options discussed above can be applied (e.g. sending a secondary request to the secondary request or doing nothing or adjusting the heating schedule despite the lack of input from the user or users).

While the invention has been described with respect to a limited number of embodiments, it will be appreciated that many variations, modifications and other applications of the invention may be made. Therefore, the claimed invention as recited in the claims that follow is not limited to the embodiments described herein.

What is claimed is:

1. A method for providing an interactive learning heating schedule for a water boiler system including a boiler tank, a first temperature sensor located in an intake pipe, outside of the boiler tank, a second temperature sensor located in an outlet pipe outside of the boiler tank and a flow meter located outside of the boiler tank, the method comprising the steps:
    (a) receiving, by a microprocessor, an estimate of an amount of available hot water in the boiler tank of the water boiler system, said estimate calculated, in part, from sensor data received from the first and second temperature sensors and the flow meter;
    (b) receiving, by said microprocessor, usage data for the water boiler system, said usage data including at least one expected usage pattern extrapolatd from said usage data, said at least one expected usage pattern extrapolated by comparison of said usage data at similar portions of time over multiple days;
    (c) generating, by said microprocessor, a heating schedule for the boiler tank, based on said at least one expected usage pattern and said estimated amount of available hot water; and
    transmitting an instruction, by the microprocessor, to an actuator of a heating element in the boiler tank, wherein reception of said instruction causes said actuator to activate said heating element at a time indicated by said heating schedule and transmitting a second instruction by said microprocessor, to said actuator, after a period of time dictated by said heating schedule, wherein reception of said second instruction causes said actuator to deactivate said heating element.

2. The method of claim 1, further comprising the step of:
    (d) detecting a deviation in said expected usage pattern, and
    (e) adjusting said heating schedule as a result of said detected deviation.

3. The method of claim 1, further comprising the steps of:
    (d) detecting An indicator of an expected deviation in said expected usage pattern, and
    (e) adjusting said heating schedule as a result of said detected indicator.

4. The method of claim 2, further comprising the step of:
    (f) sending a feedback request, by said microprocessor, to a user after detecting said deviation and prior to adjusting said heating schedule, said feedback request present in a medium selected from the group including: audio, visual and audio-visual.

5. The method of claim 4, further comprising the step of sending a secondary request, by said microprocessor, after a predetermined time has lapsed prior to receiving a feedback response to said feedback request, said feedback response being supplied by said user via a Human Input Device (HID).

6. The method of claim 5, wherein said secondary request is selected from the group of requests including: a second feedback request to said user, a second feedback request to a second user related to said user.

7. The method of claim 4, wherein said step of adjusting said heating schedule is performed after a predetermined time has lapsed prior to receiving a feedback response, via an HID, to said feedback request.

8. The method of claim 4, wherein said step of adjusting said heating schedule is skipped after a predetermined time has lapsed prior to receiving a feedback response, via an HID, to said feedback request.

9. The method of claim 4, further comprising the step of:
    (g) receiving a feedback response from said user, via an HID, wherein said step of adjusting said heating schedule is performed or skipped based on said feedback response.

10. The method of claim 1, wherein said expected usage pattern is further extrapolated from a location of a user of the water boiler system.

11. The method of claim 2, wherein said expected usage pattern is further extrapolated from a location of a user of the water boiler system and wherein said deviation is detected when said location of said user is different from an expected said location of said user.

12. The method of claim 1, wherein said expected usage pattern is further extrapolated from an activity of a user of the water boiler system.

13. The method of claim 2, wherein said expected usage pattern is further extrapolated from an activity of a user of the water boiler system and wherein said deviation is detected when said activity of said user is different from an expected said activity of said user.

14. The method of claim 1, wherein said expected usage pattern is further extrapolated from an activity and location of a user of the water boiler system.

15. The method of claim 2, wherein said expected usage pattern is further extrapolated from an activity and location of a user of the water boiler system and wherein said deviation is detected when said activity and location of said user is different from an expected said activity and location of said user.

16. A computer program product embodied on a non-transitory storage medium and executed via a processor for effecting the steps of claim 1.